US008065716B2

(12) United States Patent
Harwell (10) Patent No.: US 8,065,716 B2
(45) Date of Patent: Nov. 22, 2011

(54) METHOD, SYSTEM AND ARTICLE FOR DYNAMIC AUTHORIZATION OF ACCESS TO LICENSED CONTENT

(75) Inventor: Janis L. Harwell, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 1344 days.

(21) Appl. No.: 11/624,611

(22) Filed: Jan. 18, 2007

(65) Prior Publication Data

US 2008/0178284 A1   Jul. 24, 2008

(51) Int. Cl.
  *H04L 7/04* (2006.01)
  *G06F 17/30* (2006.01)
  *G06F 15/16* (2006.01)
  *H04L 29/06* (2006.01)
(52) U.S. Cl. .......................................... 726/7
(58) Field of Classification Search .................. 726/7
  See application file for complete search history.

(56) References Cited

U.S. PATENT DOCUMENTS

| | | | | |
|---|---|---|---|---|
| 2001/0032312 | A1* | 10/2001 | Runje et al. | 713/172 |
| 2002/0002466 | A1* | 1/2002 | Kambayashi et al. | 705/1 |
| 2002/0044657 | A1* | 4/2002 | Asano et al. | 380/201 |
| 2002/0107806 | A1* | 8/2002 | Higashi et al. | 705/51 |
| 2003/0028787 | A1* | 2/2003 | Fayed et al. | 713/189 |
| 2003/0198350 | A1* | 10/2003 | Foster et al. | 380/281 |
| 2005/0042983 | A1 | 2/2005 | Borgward | |
| 2005/0154682 | A1* | 7/2005 | Taylor | 705/71 |
| 2005/0243364 | A1* | 11/2005 | Sakai | 358/1.15 |
| 2006/0150251 | A1* | 7/2006 | Takashima et al. | 726/26 |
| 2006/0224903 | A1 | 10/2006 | Ginter et al. | |
| 2006/0227973 | A1* | 10/2006 | Takashima et al. | 380/277 |
| 2006/0259770 | A1* | 11/2006 | Peinado | 713/171 |
| 2008/0069354 | A1* | 3/2008 | Kitani et al. | 380/202 |

FOREIGN PATENT DOCUMENTS

JP    2005316994 A  * 11/2005

OTHER PUBLICATIONS

Chiaki, Susumu. Machine translation of JP2005316994, Apr. 2005.*
Mohan, "Tutorial: Application Servers and Associated Technologies," 28th International Conference on Very Large Data Bases, Hong Kong, China, 2002, retrieved from http://www.almaden.ibm.com/u/mohan/AppServersTutorial_VLDB2002_Slides.pdf, downloaded on Jun. 28, 2008.

* cited by examiner

*Primary Examiner* — Michael Simitoski
(74) *Attorney, Agent, or Firm* — Seed IP Law Group PLLC (57) ABSTRACT

A content player receives a content carrier, which includes a first computer readable medium and a second computer readable medium, and determines whether a valid license exists for accessing content or a segment of content carried in the first computer readable medium. The first computer readable medium includes a first authorization token, and the second computer readable medium includes a second authorization token. The first and second authorization tokens or some portions thereof are associated with each other and are associated with the segment of content. The content player uses at least the first and second authorization tokens in determining whether to grant access to the segment of content.

4 Claims, 9 Drawing Sheets

METHOD, SYSTEM AND ARTICLE FOR DYNAMIC AUTHORIZATION OF ACCESS TO LICENSED CONTENT

BACKGROUND OF THE INVENTION

1. Field of the Invention

This disclosure generally relates to authorization of access to licensed content and, more particularly, to dynamic authorization of access to licensed content using wireless memory devices.

2. Description of the Related Art

Modern technology has broadened the ways in which content may be distributed. Before the modern era of digital technology most content was distributed in media such as paper, film, television waves, and radio waves. Today, in addition to the aforementioned media, content may now be distributed in computer readable media such as, but not limited to, compact discs (CDs), digital video discs (DVDs), hard drives, memory drives such as flash drives, etc.

In the recent past, individuals did not have the equipment for copying/reproducing content and/or for transforming content. Typically, such equipment was too expensive, and if an individual did have the equipment, the quality of the copy/reproduction was not on par with the original. However, the digital age has also made it much easier and cheaper for an individual to copy/reproduce content from one medium to another medium and to transform content from one format to another format, and frequently, the digital copies/reproductions of content and/or transformations of content may be on par with the original content. For example, many individuals transform songs from CDs to MP3 format to play on a device such as a computer or MP3 player without a loss of quality. Similarly, many individuals, without authorization from the owner of content, have copied content from one medium, such as a computer or MP3 player, and, if necessary, transformed the content, and then transferred the content onto a CD or DVD.

Protecting content from unauthorized copying and/or transformation is of major concern to the owners of content. Laws such as the Digital Millennium Copyright Act have been enacted to help address those concerns. While the laws provide a deterrent to the unauthorized copying and transformation of content, the laws are not entirely effective. For example, some individuals are still using a Peer-to-Peer network to obtain and distribute content without authorization. Similarly, some individuals are still transferring content, without authorization, onto CDs and DVDs, among other computer readable mediums. Thus, there exists a need for systems and methods that can overcome at least some of the aforementioned drawbacks.

BRIEF SUMMARY OF THE INVENTION

In one aspect, a system provides dynamic authorization to access content stored in a first computer readable medium. The system comprises a database having license information for a work of content, wherein one or more master authorization tokens associated with the work of content is stored in the database, wherein the work of content is embodied in a computer readable medium, the computer readable medium having one or more first authorization tokens associated with the work of content embodied therein; wherein one or more second authorization tokens associated with the work of content are stored in a wireless memory device, and wherein a server is in communication with the database and a network, the server configured to receive via the network a content access request from a remote client that has received the content carrier and, in response to receiving the content access request, the server determines whether to give the client access to the content based upon the presence or absence of a correlation or association between all or a portion of the authorization tokens.

In another aspect, a method of providing dynamic authorization to access content stored in a first computer readable medium of a content carrier comprises: storing license information for a work of content in a database, wherein the license information includes a master authorization token associated with the work of content, wherein the work of content is embodied in a computer readable medium, the computer readable medium having one or more first authorization tokens associated with the work of content embodied therein, wherein one or more second authorization tokens associated with the work of content are stored in a wireless memory device; receiving a content access request from a remote client has received the content carrier and attempted to access the work of content; and determining whether to provide the client with access to the content based upon the presence or absence of a correlation or association between all or a portion of the authorization tokens.

In yet another aspect, a computer-readable media containing instructions to cause a processor to provide dynamic authorization to access content stored in a first computer readable medium of a content carrier, by: storing license information for a work of content in a database, wherein the license information includes a master authorization token associated with the work of content, wherein the work of content is embodied in a second computer readable medium, the second computer readable medium having one or more first authorization tokens associated with the work of content embodied therein, wherein one or more second authorization tokens associated with the work of content are stored in a wireless memory device; receiving a content access request from a remote client, wherein the remote client has received the content carrier and attempted to access the work of content; and determining whether to provide the client with access to the content based upon the presence or absence of a correlation or association between all or a portion of the authorization tokens.

In yet a further aspect, a content player for playing content carried by a content carrier having a first computer readable medium and a wireless memory device comprises: a first medium reader that reads from the first computer readable medium of the content carrier a first authorization token; a wireless communicator that reads from a memory of the wireless memory device a second authorization token; and a processor in communication with the first medium reader and the wireless communicator, the processor using at least a portion of the first and second authorization tokens to determine whether to make a content segment carried by the first computer readable medium accessible.

In another aspect, a method for accessing content carried by a content carrier having a first computer readable medium and a second computer readable medium comprises: receiving the content carrier at a content player; retrieving a first authorization token from the first computer readable medium; retrieving a second authorization token from the second computer readable medium; determining whether to grant access to a segment of the content that is associated with the first and second authentication tokens using at least a portion of the authorization tokens; and in response to determining to grant access, retrieving the segment of the content from the first computer readable medium.

In yet another aspect, a first computer-readable media containing instructions to cause a processor to control access to content carried by a content carrier having a second computer readable medium and a third computer readable medium, by: retrieving a first authorization token from the second computer readable medium; retrieving a second authorization token from the third computer readable medium; determining whether to grant access to a segment of the content that is associated with the first and second authentication tokens using at least a portion of the authorization tokens; and in response to determining to grant access, retrieving the segment of the content from the second computer readable medium.

In another aspect, an article of manufacture comprises: a first computer readable medium having a content segment and a first authorization token stored therein; and a second computer readable medium having a second authorization token stored therein, wherein the first and the second authorization tokens are associated with the content segment.

In yet another aspect, a method of controlling access to content comprises: segmenting the content into one or more content segments; generating one or more master authorization tokens, one or more first authorization tokens, and one or more second authorization tokens, all such tokens being associated with the content segment; storing the first authorization tokens and the content segments in a first computer readable medium; storing the second authorization tokens in a second computer readable medium; coupling the second computer readable medium to the first computer readable medium by wired or wireless means; and deciding whether to grant access to the content segment based on the presence or absence of a correlation or association between all or a portion of the authorization tokens.

In yet a further aspect, a first computer-readable media comprises instructions to cause a processor to control access to a work of content, by: segmenting the work of content into one or more content segments; generating one or more master authorization tokens, one or more first authorization tokens, and one or more second authorization tokens, all such tokens being associated with the content segment; storing the first authorization tokens and the content segments in a second computer readable medium; storing the second authorization tokens in a third computer readable medium; coupling the second computer readable medium to the third computer readable medium by wired or wireless means; and deciding whether to grant access to the content segment based upon the presence or absence of a correlation or association between all or a portion of the authorization tokens.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with systems and methods for playing content have not been shown or described in detail to avoid unnecessarily obscuring descriptions of the embodiments.

Unless the context requires otherwise, throughout the specification and claims which follow, the word "comprise" and variations thereof, such as "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the terms "and" and "or" are generally employed in the sense including "and/or" unless the content clearly dictates otherwise.

The headings and Abstract of the Disclosure provided herein are for convenience only and do not interpret the scope or meaning of the embodiments.

Figure 1A:
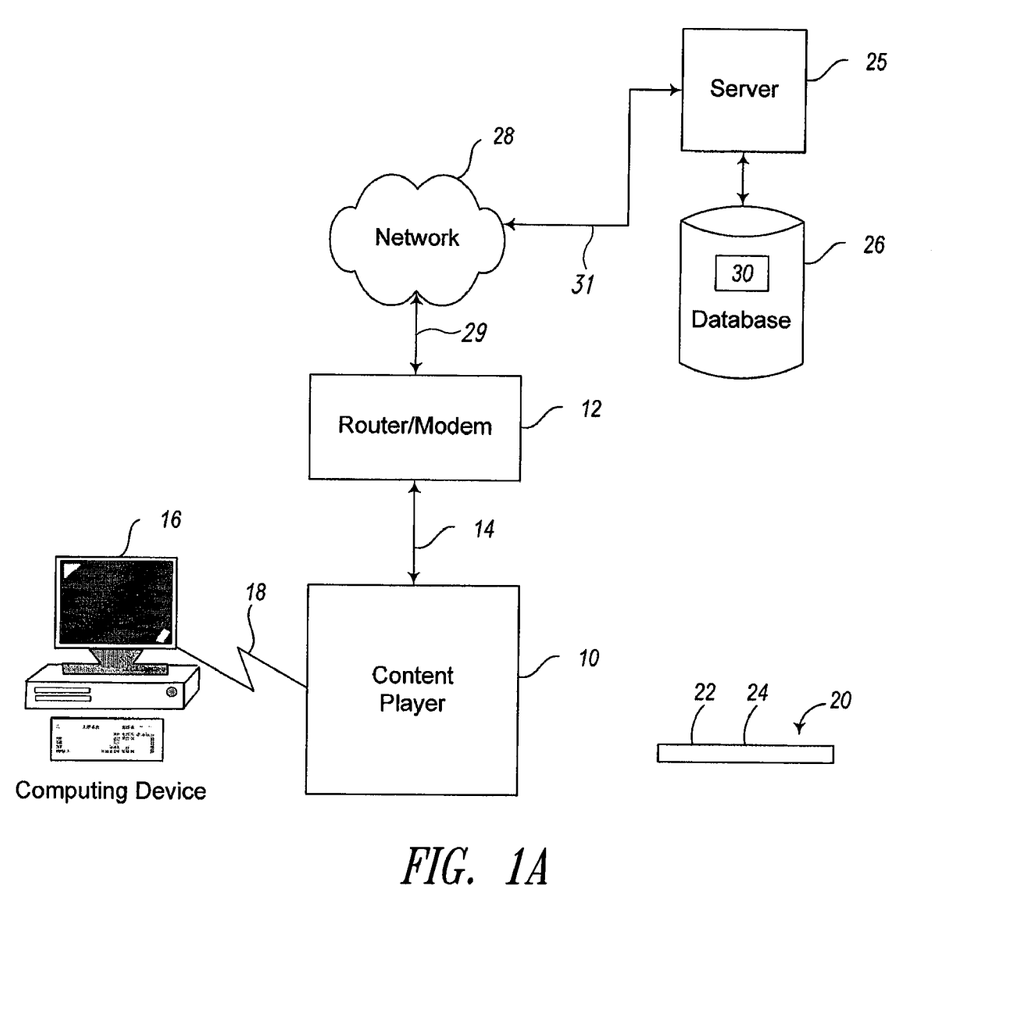
FIG. 1A is a functional block diagram of a content player and system for dynamic authorization of access to licensed content according to one illustrated embodiment.

FIG. 1A shows an embodiment in which a content player 10 and a server 25 may provide dynamic authorization of access to licensed content. The content player 10 is coupled to a router/modem 12 via a communication path 14 which may be wireless or wired (single wire, twisted wire-pair, cable, coaxial cable, optical fiber, etc.). The content player 10 is also coupled to a computing device 16 via a communication path 18 which may be wireless or wired. The computing device may be a handheld device such as a PDA or cell phone, notebook computer, a desktop computer, a workstation, etc. The router/modem 12 and the server connect with the network via communication paths 29, 31 which may be wireless or wired. Wireless communication paths 14, 18, 29, 31, may be configured to conform to any wireless protocol such as IEEE 802.11. The content player 10 is configured to receive a content carrier 20.

In some embodiments, the computing device 16 may be integrated with the content player 10 as a single device.

The content carrier 20 carries content 22 stored in a "playback" computer-readable medium 24. The content 22 may include descriptive material, data structures, nonfunctional descriptive material, functional descriptive material, software, executables, copyrightable and non-copyrightable works such as video works, audio works, and video/audio works. In some embodiments, the playback computer-readable medium 24 may be a compact disc (CD), a digital video disc (DVD), or solid memory device such as USB flash drive, for example. In some embodiments, the content carrier 20 may include a housing for housing a computer-readable medium such as, but not limited to, flash RAM. For the sake of clarity, the playback computer-readable medium 24 is described below as a DVD, but the discussion is not to DVDs.

The content player 10 is configured to selectively provide the computing device 16 with the content 22, or some portion of the content 22, stored in the DVD 24. The content player 10 is configured to communicate with the router/modem 12, which communicates with the server 25 via a network 28 such as the Internet. In one embodiment, the content player 10 selectively provides the computing device 16 with the content 22, or a portion of the content 22, based upon dynamic authentication of a license associated with the content 22. As will be explained in detail below, the content player 10 may determine whether a valid license exists for the content 22 based upon the presence or absence of correlations or associations between authorization tokens or portions thereof.

The server 25 is in communication with a database 26. Among other things, master authorization tokens 30 are stored in the database 26. Among other things, the server 25 is configured to selectively provide a master authorization token 30 to the content player 10. Among other things, the content player 10 may use the master authorization token 30 to grant or deny access to the content 22. In addition, the server 25 may selectively provide authorization tokens to the content player 10 for all of the content 22 or for a selected portion of the content 22.

When the content player 10 receives the DVD 24, the content player 10 may request a master authorization token 30 that is associated with the content 22 from the server 25. The content player 10 includes logic for, among other things, authenticating the DVD 24 using at least the master authorization token 30. Once the content player 10 has authenticated the DVD 24, the content player 10 may provide a computing device 16 with some or all of the content 22 stored on the DVD 24. In some embodiments, the content player 10 may retrieve multiple master authorization tokens 30 from the database 26. The content player 10 may use some or all of the multiple master authorization tokens 30 to provide the computing device 16 with the content 22. In some embodiments, a user may use the content player 10 or the computing device 16 to purchase or renew licenses from the server 25.

Figure 1B:
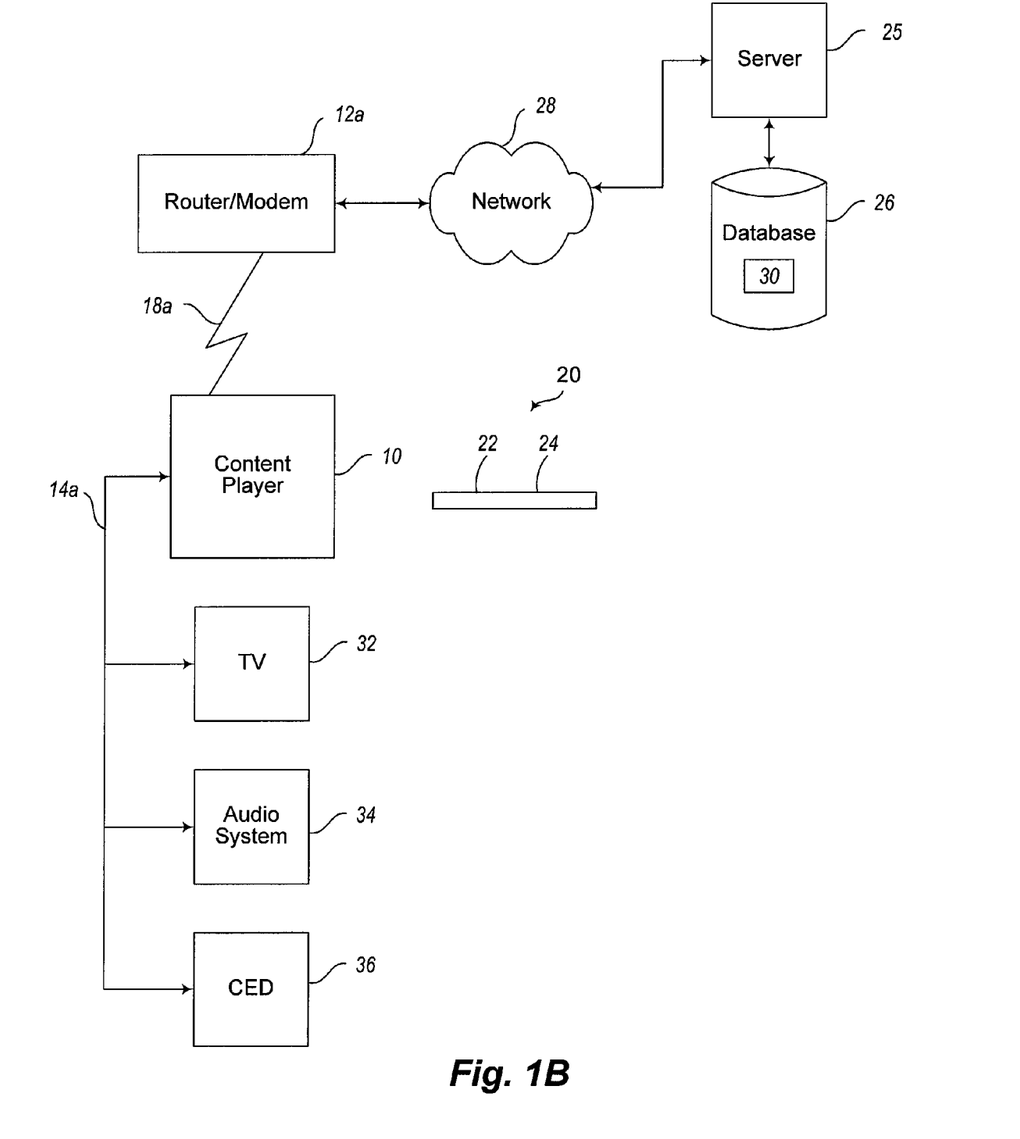
FIG. 1B is a functional block diagram of a content player and a system for dynamic authorization of access to licensed content according to a second illustrated embodiment.

FIG. 1B shows another embodiment of the content player 10 according to second illustrated embodiment. In FIG. 1B, the various labels having both a reference numeral and a letter "a" identify similar components and/or features as those of FIG. 1A that are labeled with the same reference numeral. (For example, the labels "18" and "18a" are used to identify the wireless communication path in FIG. 1A and FIG. 1B, respectively.) The detailed description of such components are initially provided with respect to the embodiment of FIG. 1A and for the sake of brevity the description of such components in the context of their subsequently a labeled counterparts in FIG. 1B are abbreviated or omitted.

In FIG. 1B, the content player 10 is coupled to a television 32, an audio system 34, and a router/modem 12a. In some embodiments, the content player 10 communicates with the router/modem 12a via a wireless communication path 18a and communicates with the television 32 and/or audio system 34 via communication path 14a. The content player 10 is configured to receive the DVD 24 and selectively provide the content 22 or a portion of the content 22 to at least one of the television 32 and/or the audio system 34. The content player 10 is configured to receive the master authorization token 30 associated with the content 22 from the database 26 and/or to receive multiple master authorization tokens 30 from the database 26. The content player 10 is further configured to use at least one of the received master authorization tokens 30 to selectively provide all content 22 or a portion of the content 22 to at least one of the television 32 and/or audio system 34.

In some embodiments, the content player 10 may be integrated with one or more of the television 32, the audio system 34 and the consumer electronic device 36 as a single device.

It should be noted that the television 32 and audio system 34 are merely exemplary devices suitable for receiving content 22 from the content player 10. In the embodiment illustrated in FIG. 1B, the content player 10 is also coupled to a consumer electronic device 36. Non-limiting examples of consumer electronic devices 36 include, but are not limited to, personal digital assistants (PDAs); tablets; and game systems such as PlayStation®, Xbox, MP3 players, etc.

Figure 1C:
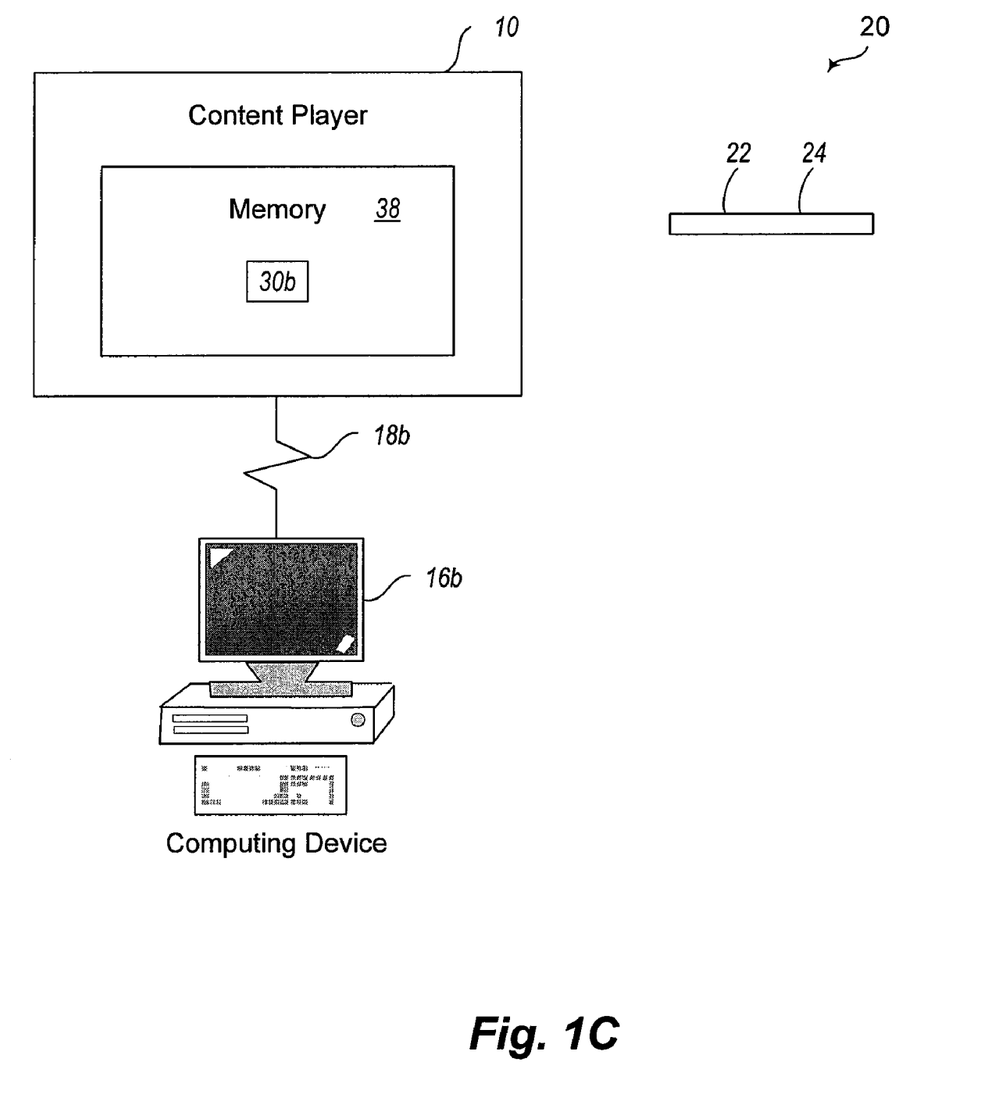
FIG. 1C is a block diagram of a content player for dynamic authorization of access to licensed content according to one illustrated embodiment.

FIG. 1C shows another embodiment of the content player 10 according to a third illustrated embodiment. In FIG. 1C, the various labels having both a reference numeral and a letter "b" identify similar components and/or features as those of FIG. 1A that are labeled with the same reference numeral. The detailed description of such components are initially provided with respect to the embodiment of FIG. 1A and for the sake of brevity the description of such components in the context of their subsequently b-labeled counterparts in FIG. 1C are abbreviated or omitted.

In FIG. 1C, the content player 10 includes a memory 38 having multiple master authorization tokens 30b stored therein. The content player 10 is configured to receive the DVD 24 and use at least one or more of the master authorization tokens 30b to determine whether a license to access the content 22 and/or portions of the content 22 exists. The content player 10 is configured to selectively access licensed content.

The master authorization tokens 30b may be stored in the memory 38 during the manufacture of the content player 10 or generated in a secure manner and then provided to selected or authorized manufacturers or users of the content player 10.

Figure 2A:
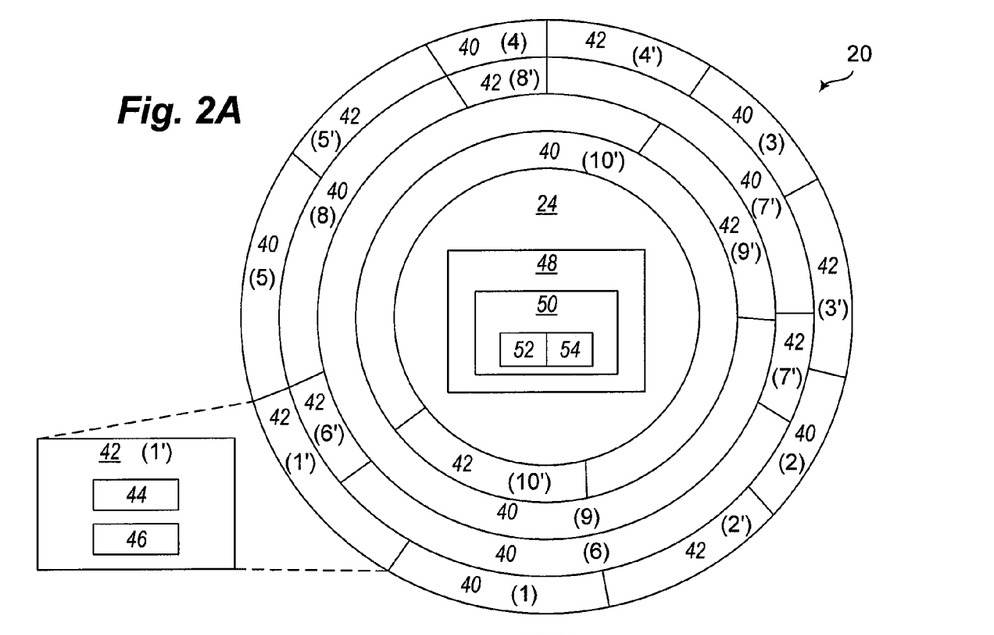
FIG. 2A is a functional block diagram of a content carrier according to one illustrated embodiment.

FIG. 2A shows a content carrier 20 illustrated according to one embodiment. In this embodiment, the content carrier 20 includes a disk such as, but not limited to, DVD 24 and a wireless memory device 48. The content 22 is carried by the DVD 24 in multiple content segments 40. The DVD 24 also carries multiple authorization segments 42 interspersed between the content segments 40. In some embodiments, there is a one-to-one correspondence between the number of content segments 40 and the number of authorization segments 42. In other embodiments, the number of content segments 40 may be greater than the number of authorization segments 42, and in yet other embodiments, the number of content segments 40 may be less than the number of authorization segments 42. For the sake of simplicity, the DVD 24 is described below as having an equal number of content segments 40 and authorization segments 42.

Each one of the content segments 40 is associated with one of the authorization segments 42. In the embodiment illustrated in FIG. 2, the content segment 42 denoted by (1) is associated with the authorization segment 42 denoted by (1'), the content segment 42 denoted by (2) is associated with the authorization segment 42 denoted by (2'), and so on, etc.

In some situations, the DVD 24 may carry multiple works of content. For example, the DVD 24 may carry one or more works of audio content such as, but not limited to, songs, recordings, speeches, etc., and/or one or more works of video content such as, but not limited to, movies, one or more episodes of one or more television shows, etc., and/or one or more works of logic such as, but not limited to, software programs, executables, data structures, functional descriptive material, etc. A given work of content such as, but not limited to, a movie may be divided into multiple content segments. For example, the content segments 40 that are denoted by (1)-(6) may be a first work of content, and the content segments 40 that are denoted by (7)-(10) may be a second work of content. The content segments of any work of content may or may not be stored sequentially.

Each authorization segment 42 is comprised of a first authorization token 44 and a second authorization token address 46. The first authorization token 44 may be used by the content player 10 in determining whether the content player 10 should play the associated content segment 40. For example, the content player 10 may read the first authorization segment 42, which is denoted by (1'), prior to playing the first content segment 40, which is denoted by (1). The content player 10 may then use the first authorization token 44 included in the first authorization segment 42 to determine whether to play the first content segment 40. In some embodiments, the first authorization token 44 may include an identifier for the master authorization tokens 30.

The second authorization token address 46 provides an address or a reference to a second authorization token that the content player 10 may also use in determining whether to play a given content segment.

The wireless memory device 48 may be a radio frequency identification (RFID) device such as an RFID tag configured to wirelessly communicate with the content player 10. The memory 50 includes one or more second authorization tokens 52. Typically, the number of second authorization tokens 52 carried in the memory 50 corresponds to the number of authorization segments 42. In some embodiments, the memory 50 might include writable and non-writable memory. The non-writable memory may include permanent information such as a unique identifier 54, for example a serial number, associated with the wireless memory device 48. The unique identifier 54 may be stored in the memory 50 during the manufacture of the wireless memory device 48.

The second authorization tokens 52 may be used by the content player 10 when the content player 10 plays the DVD 24. In some embodiments, the unique identifier 54 may also be used by the content player 10 when playing the DVD 24. It should be noted that in some embodiments some or all of the memory may be encrypted. Similarly, in some embodiments, some or all of the authorization segments 42 may be encrypted. Alternatively, in some embodiments, a portion, or portions, of the authorization segments 42 may be encrypted.

Figure 2B:
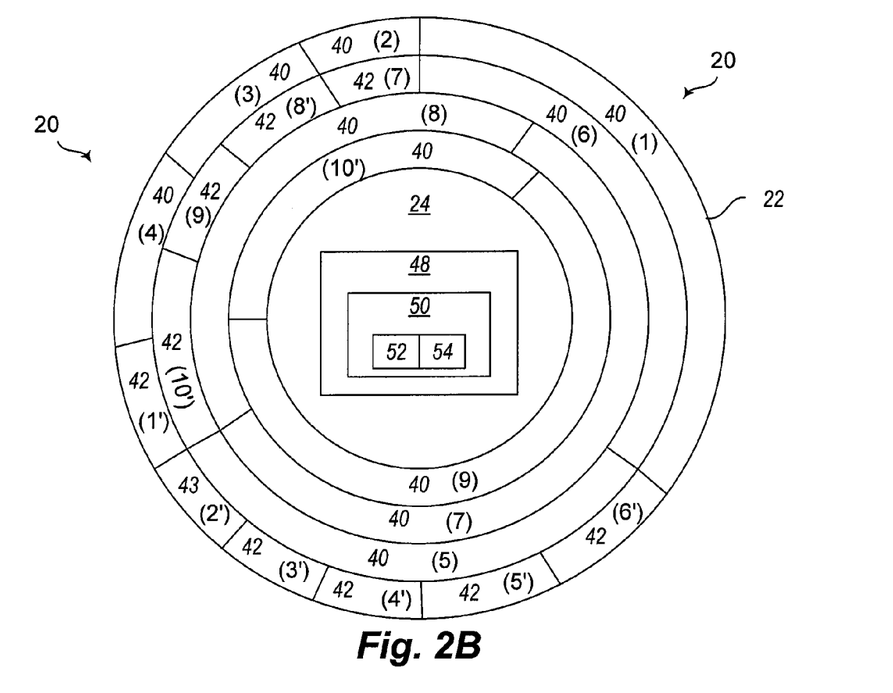
FIG. 2B is a functional block diagram of a content carrier according to a second illustrated embodiment

FIG. 2B shows another embodiment of the content carrier 20. In this embodiment, the DVD 24 carries multiple authorization segments 42, which are contiguously disposed on the DVD 24. In the embodiment illustrated in FIG. 2B, the DVD 24 carries two sequences of contiguously disposed authorization segments 42. The first sequence of authorization segments 42 is used by the content player 10 when determining whether to play the content segments 42 that comprise a first work of content. The second sequence of authorization segments 42 is used by the content player 10 when determining whether to play the content segments that comprised a second work of content. For example, the authorization segments 42 that are denoted with (1')-(6') are associated with a work of content carried by the content segments 40 that are denoted (1)-(6).

It should be noted that the location of the authorization segments 42 on the computer readable medium, DVD 24, is a matter of choice. In the embodiment illustrated in FIG. 2A, the authorization segments 42 precede the content segments 40 with which they are associated. However, in other embodiments, the authorization segments 42 might follow the content segments 40 with which they are associated. In yet other embodiments, the authorization segments 42 may be disposed on the DVD 24 at a predetermined location, or predetermined locations, such as, but not limited to, the beginning of the DVD 24 or the end of the DVD 24. In yet other embodiments, the DVD 24 might include a map (not shown) or a set of pointers that provides the locations on the DVD 24 of the authorization segments 42.

Figure 3:
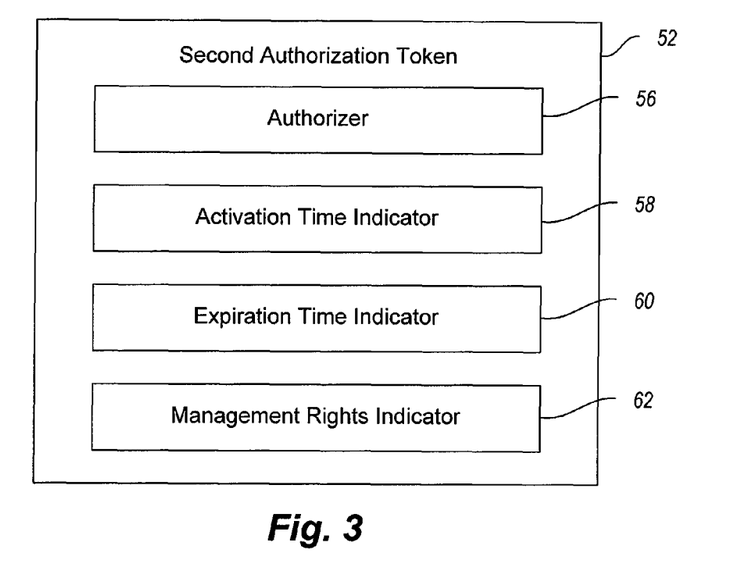
FIG. 3 is a functional block diagram of a second authorization token according to one illustrated embodiment.

FIG. 3 shows an embodiment of one of the second authorization tokens 52 according to the illustrated embodiment. The second authorization token 52 may include an authorizer 56, an activation time indicator 58, an expiration time indicator 60, and management rights indicator 62. Among other things, the authorizer 56 may be a key such as an encryption key, decryption key, or an output of a function such as, but not limited to, a secure hash function, or an input to a function such as, but not limited to, a secure hash function. The authorizer 56 may be logically related to at least one of the master authorization tokens or portions thereof 30 or with at least one of the first authorization tokens or portions thereof 44 or with at least one of the master authorization tokens or portions thereof 30.

The content player 10 may use the activation time indicator 58 to determine whether to play a work of content 22 or a content segment 40. For example, prior to playing a particular content segment 40, the content player 10 may read the first authorization token 42 associated with the particular content segment 40 and use the second authorization token address 46 to read the appropriate second authorization token 52. The content player 10 may then read the activation time indicator 58 and determine whether to play the particular content segment 40 based upon a reference time and the activation time indicator 58. The content player 10 may have an internal clock for keeping the reference time, or the content player may communicate with an external time-keeper such as server 25. If the reference time is earlier than the activation time indicator 58, then the content player 10 will not play the particular content segment 40.

Similarly, the content player 10 may use the expiration time indicator 60 to determine whether to play a work of content 22 or a content segment 40. For example, prior to playing a particular content segment 40, the content player 10 may read the first authorization token 42 associated with the particular content segment 40 and use the second authorization token address 46 to read the appropriate second authorization token 52. The content player 10 may then read the expiration time indicator 60, and may then determine whether to play the particular content segment 40 based upon a reference time and the expiration time indicator 60. If the reference time is later than the expiration time indicator 60, then the content player 10 will not play the particular content segment 40.

Among other things, the management rights indicator 62 may be used to limit access to content 22 and/or to particular content segments 40 such as the content segments that comprise a work of content. In one non-limiting example, the management rights indicator 62 may restrict the number of times that a content segment may be played; or may restrict content carrier 20 from being played in certain types of content players. For example, the management rights indicator 62 may be used to indicate that a content segment 40 (or a plurality of content segments 40) cannot be played in a content player having recording capabilities.

Figure 4:
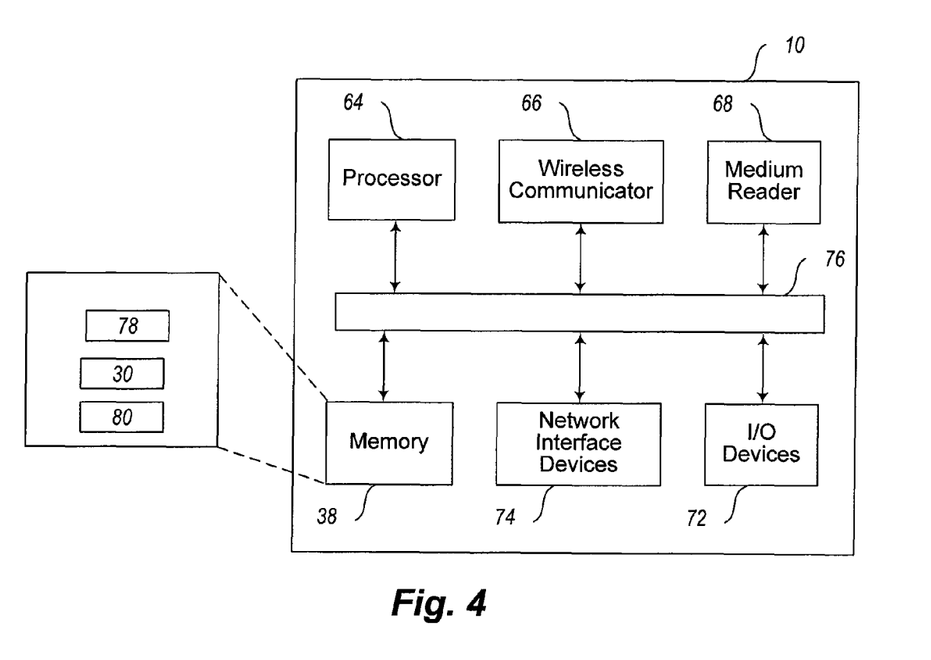
FIG. 4 is a functional block diagram of a content carrier according to one illustrated embodiment.

FIG. 4 shows a content player 10 having a processor 64, a wireless communicator 66, a medium reader 68, memory 38, input/output (I/O) devices 72 and optional network interface devices 74, all of which are communicatively coupled by a bus 76. In some embodiments, the content player 10 may include more than one bus 76 which may be used to connect components of the content player 10. For example, separate buses may be provided for power, control and data.

The I/O devices 72 may include input devices, for example but not limited to, a keyboard, mouse, microphone, a touch sensitive display, a remote control, etc. Furthermore, the I/O devices 72 may also include output devices, for example but not limited to, a display device, speaker, etc. The I/O devices 72 may further include ports for connecting the content player 10 to devices such as, but not limited to, the computing device 16, the television 32, the audio system 34, and consumer electronic device 36 of FIG. 1B, etc.

The network interface devices 74 may include a port or a radio frequency (RF) or other transceiver, for communicating with the router/modem 12 of FIG. 1B. In some embodiments, network interface devices may include a modulator/demodulator (modem for accessing another device, system, or network), a telephonic interface, a bridge, a router, etc., such that the content player 10 can communicate over the network 28.

The medium reader 68 is configured to read a computer readable medium such as the DVD 24. In some embodiments, the medium reader 68 may be a CD drive, a DVD-drive, a CD/DVD-drive, tape drive, memory drive such as, but not limited to, a flash drive, etc. When the medium reader 68 reads one of the second authorization tokens 42, the medium reader 68 provides the processor 64 with the read second authorization tokens 42. In some embodiments, the medium reader 68 may read a sequence of second authorization tokens 42 and provide the processor with the sequence of second authorization tokens 42.

The wireless communicator 66 is configured to read the memory 50 of the wireless memory device 48, and, in some embodiments, the wireless communicator 66 may write to the memory 50. In some embodiments, the wireless communicator 66 may be an RFID reader. In some embodiments, the wireless communicator 66 may read memory 50 at one time and provide the processor 64 with the read second authorization tokens 52 and with the read unique identifier 54. In some embodiments, the wireless communicator 66 reads specific portions of the memory 50. For example, the processor 64 may use a second authorization token address to direct the wireless communicator 66 to read a specific portion of the memory 50.

The processor 64 is a hardware device for executing software, particularly that stored in memory 38. The processor 64 can be any device for executing software instructions. Non-limiting examples of a processor device include microprocessor, digital signal processor (DSP), application-specific integrated circuit (ASIC), and field programmable gate array (FPGA).

The memory 38 can include any one or combination of volatile memory elements (e.g., RAM, such as DRAM, SRAM, SDRAM, etc.) and nonvolatile memory elements (e.g., ROM, flash memory, etc.). Moreover, the memory 38 may incorporate electronic, magnetic, optical, and/or other types of storage media. The memory 38 can have a distributed architecture, where various components are situated remote from one another, but can be accessed by the processor 64.

The memory 38 includes an operating system module 78, at least one master authorization token(s) 30, and an authorization module 80. The downloading procedure for master authorization tokens 30 is discussed below. In some embodiments, the memory 38 may be used to store at least a portion of the read second authorization tokens 52 and/or at least a portion of the read unique identifier 54 and/or at least a portion of the read first authorization tokens 44. If the memory 38 stores the first authorization tokens 44 and/or second authorization tokens 52 and/or the unique identifier 54, the storage may be temporary. In some embodiments, the first authorization tokens 44 and/or second authorization tokens 52 and/or the unique identifier 54 may be temporarily stored while the content player 10 plays the content carrier 20, and the stored first authorization tokens 44 and/or second authorization tokens 52 and/or the unique identifier 54 may be deleted or overwritten after the content player 10 has finished playing the content carrier 20. Similarly, in some embodiments, the master authorization token 30 may also be temporarily stored in the memory 38.

Among other things, the processor 64 executes the operating system 78 to control the execution of authorization module 80 and provide scheduling, input-output control, file and data management, memory management, and communication control and related services.

The processor 64 executes the authorization module 80 to determine whether to play the DVD 24. Among other things, the authorization module 80 may include logic for communicating with the server 25 and retrieving master authorization tokens 30. The authorization module 80 may also include logic for communicating with the server 25 to allow a user to purchase a permanent license to the content 22 and/or to purchase a permanent license to portions of the content 22 such as a work of content. In addition, the authorization module 80 may also include logic for communicating with the server 25 to purchase a temporary license for the content 22 or to purchase a temporary license to a portion of the content 22 such as a work of content. When purchasing a license, the authorization module 80 may receive an expiration date for the license. The expiration date might be "never" for a permanent license and a specific date/time for a temporary license.

Typically, the processor 64 executes the authorization module 80 and processes the master, first, and second authorization tokens, 30, 44, and 52, respectively, to determine whether there is a valid license, and consequently, whether to play the content 22 or whether to play a portion of the content 22. The master, first, and second authorization tokens, 30, 44, and 52, are logically related, and the authorization module 80 includes the logic for using the logical relationship between the authorization tokens to determine whether to play some or all of the content 22 on the DVD 24.

As a non-limiting example, the master, first, and second authorization tokens, 30, 44, and 52, may be logically related via a secure hash function and the unique identifier 54. In particular, the authorizer 56, which may be generated during or prior to the recording of content 22 onto the DVD 24, may be the output of the secure hash function that has as its inputs at least a portion of the master authorization token 30, at least a portion of the first authorization token 44, and at least a portion of the unique identifier 54. The authorization module 80 includes the logic for receiving the unique identifier 54 and the master, first, and second authorization tokens 30, 44, and 52, respectively, and providing the appropriate portions of the unique identifier 54, the master authorization token 30, and first authorization token 44 as inputs to the same secure hash function, which produces an output. The authorization module 80 compares the output of the secure hash function with the authorizer 56, and if the output and the authorizer 56 are the same, then the authorization module 80 determines that a valid license exists for the content 22 or a portion of the content 22 and that the licensed content may be played. In other embodiments, the master, first, and second authorization tokens, 30, 44, and 52, may be logically related by encryption/decryption including public-key/private-key pairs.

In some embodiments, the authorization module 80 may compare the output of the secure hash function and the authorizer 56, and if the output and the authorizer 56 match, the authorization module may perform additional checks. Other checks for determining whether a valid license exists include, but are not limited to, using the activation time indicator 58, the expiration time indicator 60, and/or the management rights indicator 62.

Figure 5:
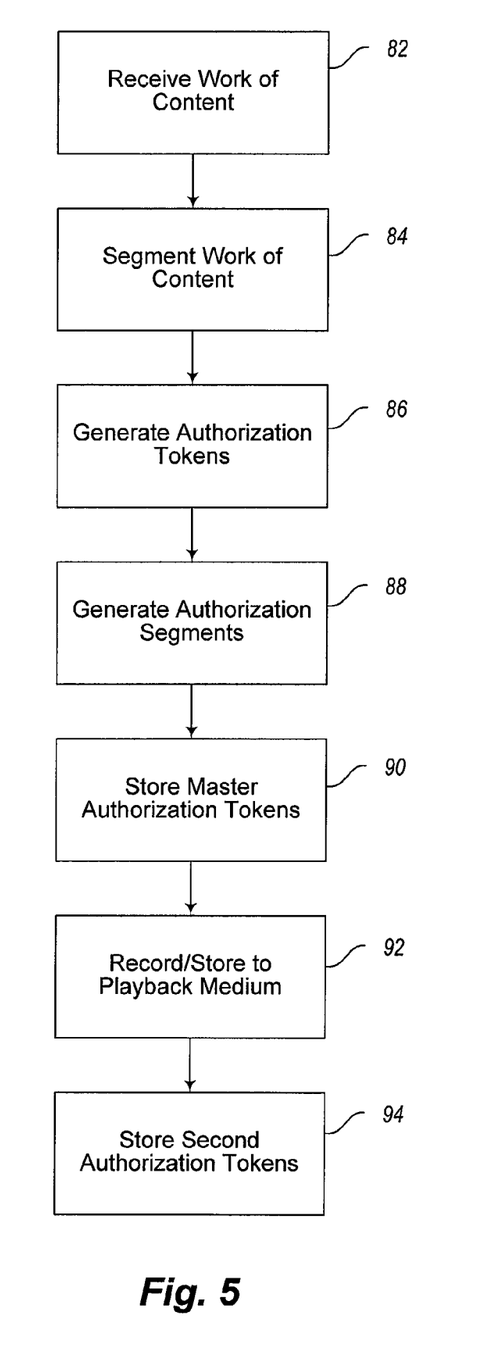
FIG. 5 is a flow diagram showing a method of protecting content according to one illustrated embodiment.

FIG. 5 shows a method for protecting content according to one embodiment.

At 82, a work of content is received.

At 84, the work of content is broken into segments. In some embodiments, it may be desired not to segment a work of content. In addition, in some embodiments, more than one work of content can be associated together to form a single segment.

At 86, authorization tokens are generated. Normally, a master authorization token 30, a first authorization token 44, and second authorization token 52 are generated for each segment of a work of content. In some embodiments, one or more of the master authorization tokens 30, the first authorization tokens 44, and the second authorization tokens 52 may be generated for each segment of a work of content. For example, in some embodiments, while a first authorization token 44 and a second authorization token 54 are generated for each segment of a work of content, a single master authorization token 30 may be generated and used with multiple segments of the work of content. In addition, single master authorization token 30 may be used with multiple works of content. The generated master authorization token or portions thereof 30, a first authorization token or portions thereof 44, and a second authorization token or portions thereof 52 are logically related.

At 88, authorization segments 42 are generated. Each authorization segment 42 includes one of the generated first authorization tokens 44, which is associated with one of the generated second authorization tokens 52, and the authorization segment 42 includes the second authorization token address 46, which indicates the location of the associated second authorization token 52 in the memory 50.

At 90, master authorization tokens are stored. In some embodiments, the master authorization tokens 30 may be stored in a secure location such as database 26 and provided to the content player 10 in response to requests from the content player 10. In other embodiments, the master authorization tokens 30 may be provided to manufacturers of the content player 10 or provided to other authorized entities and stored in the memory 38.

At 92, one or more works of content are stored/recorded in the first computer readable medium 24 of the content carrier 20. In addition, the authorization segments 42 for the recorded one or more works of content are also stored/recorded to the first computer readable medium 24.

At 94, the generated second authorization tokens 52 are stored in the memory 50 of the wireless memory device 48 of the content carrier 20.

Figure 6:
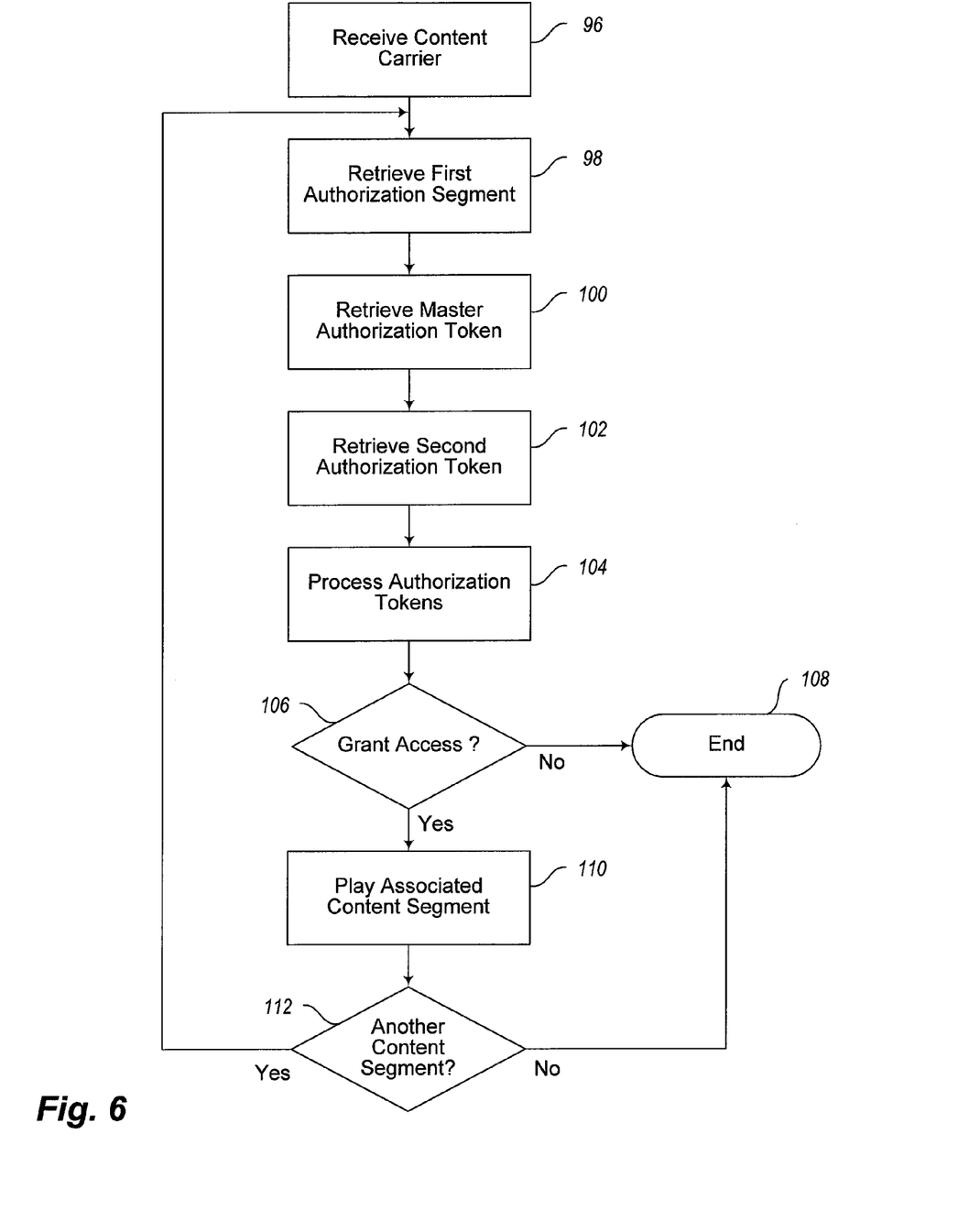
FIG. 6 is a flow diagram showing a method of accessing protected content according to one illustrated embodiment.

FIG. 6 shows a method employed by the content player 10 to access a work of content according to one embodiment.

At 96, the content player 10 receives the content carrier 20 carrying a work of content that a user wants to play on the content player 10 or have the content player 10 provide the content to another device such as the television 32. The content carrier 20 includes the playback computer readable medium such as, but not limited to, the DVD 24 and the wireless memory device 48. The user selects the work of content for the content player 10 to play.

At 98, medium reader 60 retrieves a given authorization segment 42 from the DVD 24. The given authorization segment 42 includes the second authorization token address 46. Typically, the medium reader 60 retrieves the authorization segments 42 as the medium reader 60 reads the DVD 24. In other words, the medium reader 60 may retrieve the authorization segments 42 when the medium reader 60 finds an authorization segment 42 in the process of playing the selected work of content. In some embodiments, the medium reader 60 may retrieve multiple authorization segments 42 or all of the authorization segments 42 associated with the selected work of content at one time. For example, the medium reader 60 may read more than one of the authorization segments 42 associated with the selected work of content prior to reading a first content segment 40 of the selected work of content. The medium reader 60 provides the processor 64 with retrieved authorization segments.

At 100, the processor 64 retrieves a given master authorization token 30 for the work of content selected by the user. In some embodiments, the processor 64 retrieves the given master authorization token 30 from the memory 38, and in other embodiments, the processor retrieves the given master authorization token 30 from the database 26. Typically, the given master authorization token 30 is associated with the first content segment 40 of the selected work of content. Typically, when the processor 64 retrieves the given master authorization token 30 from the database 26, the processor 64 retrieves all of the master authorization tokens associated with selected work of content. In some embodiments, the processor 64 uses information included in the first authorization tokens for retrieving the master authorization tokens.

At 102, the processor 64 provides the wireless communicator 66 with the second authorization token address 46 associated with the selected work of content. The wireless communicator 66 retrieves the second authorization token 52 from the memory 50 using the second authorization token address 46. In some embodiments, the wireless communicator 66 may also retrieve the unique identifier 54.

At 104, the processor 64 processes the master, first, and second authorization tokens using the authorization module 80. In some embodiments, the processor 64 may use one of the authorization tokens to decrypt another authorization token. Alternatively, the processor 64 may use functions such as generating a hash or secure hash using one or more of the master, first, and second authorization tokens.

At 106, processor 64 determines whether to grant access to the content segment 40 associated with the processed first authorization token. In some embodiments, the processor 64 may use at least a portion of the master, first, and second authorization tokens to generate an output that is logically related to the master, first, and second authorization tokens or portions thereof and then compare the generated output with information carried by one (or more) of the master, first, and second authorization tokens. Based upon the comparison, the processor 64 may grant or deny access.

In some embodiments, the processor 64 may also use the activation time indicator 58, or the expiration time indicator 60. For example, the processor 64 may deny access if the activation time indicator 58 is later than a reference time. Similarly, the processor 64 may deny access if the expiration time indicator 58 is earlier than a reference time.

In some embodiments, the processor 64 may also use the management rights indicator 62 in determining whether or not to grant access. For example, the management rights indicator 62 may indicate that the selected work of content cannot be played on a content player having record capabilities, and if so, the processor 64 may will deny access if the content player 10 has record capabilities. Similarly, the management rights indicator 62 might include a restriction on the number of times the selected work of content can be played. In that case, the management rights indicator 62 might include the maximum number of allowed playbacks and of the current number of previous playbacks. If the number of previous playbacks is less than the maximum number of allowed playbacks, then the processor 64 may grant access. Upon granting access, the processor 64 may then increment the number of previous playbacks and instruct the wireless communicator 66 to write the new number of previous playbacks to the memory 50.

At 108, the process ends if the decision is not to grant access. In some embodiments, if processor 64 decides to not grant access, then the user may use the content player 10 to retrieve the appropriate authorization tokens or rights from the server 25.

At 110, the content segment associated with the first authorization token is "played" if the decision is to grant access.

At 112, the processor 64 determines whether there is another content segment 40 to be played. If not, the process ends at 108. If so, the process returns to 98.

Figure 7:
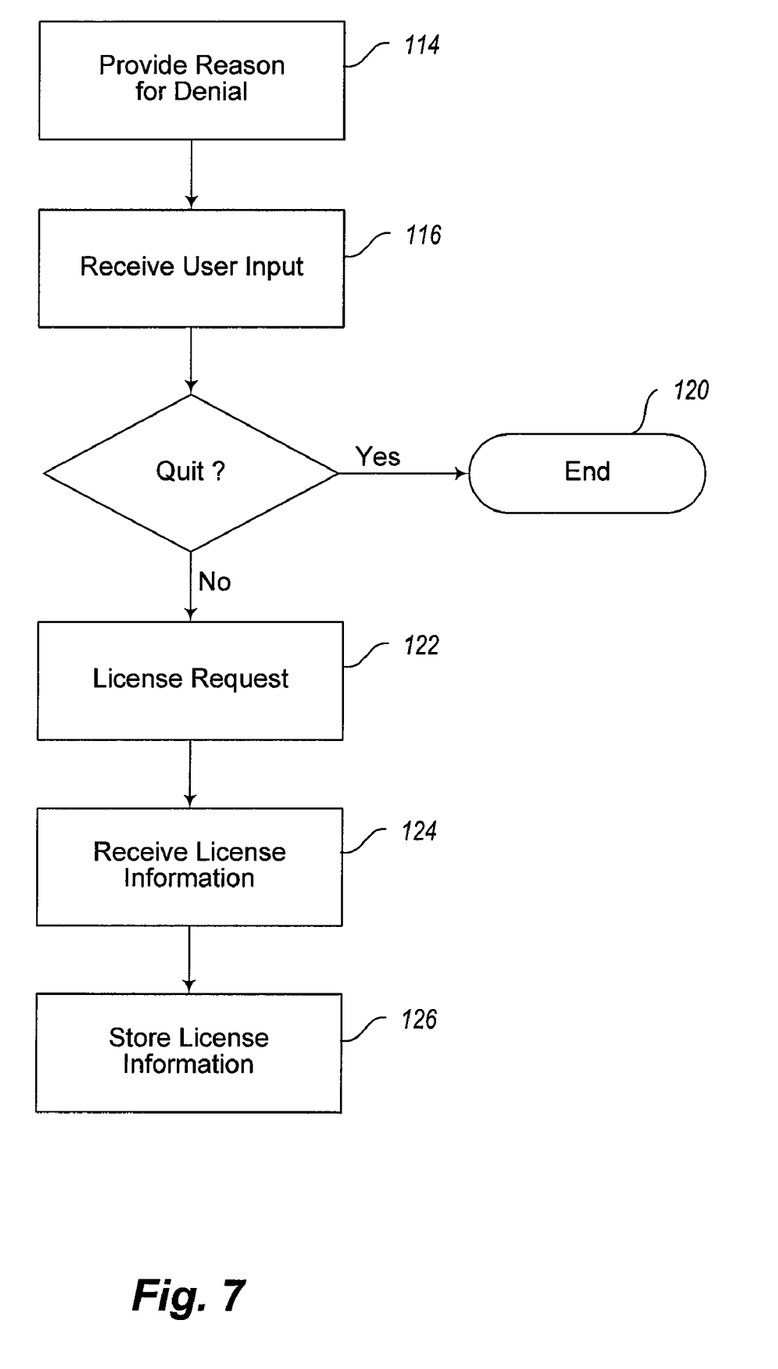
FIG. 7 is a flow diagram showing a method employed to make a work of content accessible according to one embodiment.

FIG. 7 shows a method employed by the content player 10 to make a work of content accessible according to one embodiment. The following method may be employed after the content player has determined (at 106) not to make the work of content accessible.

At 114, the content player 10 provides a reason for denial of access to the user of the content player 10 and one or more options such as options related to the reason for denial and quitting. Reasons for denial of access include, but are not limited to, expiration of license to the content, lack of license, content player is a forbidden device, e.g., content players having record capabilities might be forbidden from playing content, etc. The options related to reasons for denial include renewing a license, purchasing a license, ending process on current content player, etc.

At 116, the content player 10 receives a user input corresponding to one of the options.

At 118, the content player 10 determines whether the user selected an option to quit, then the process ends at 120, otherwise the process continues to 122.

At 122, the processor 64 may use the authorization module 80 to request a license from the server 25. The request may include billing information. The request may also include information indicating that a license for the content 22 has expired.

At 124, the content player 10 may receive license information such as, but not limited to, one or more master authorization tokens 30 for content segments 40 of a work of content. In some situations, the content player 10 may receive one or more second authorization tokens 52 for the content segments. In some situations, the content player 10 may receive a portion of a second authorization token 52. For example, the content player 10 may receive a management rights indicator 62 for the content segments.

At 126, the content player 10 stores the information received from the server 25. When the content player 10 receives a second authorization token, or a portion of a second authorization token such as a management rights indicator, the content player 10 may use the wireless communicator 66 to store the information in the memory 50 of the wireless memory device 48 of the content carrier 20.

Figure 8:
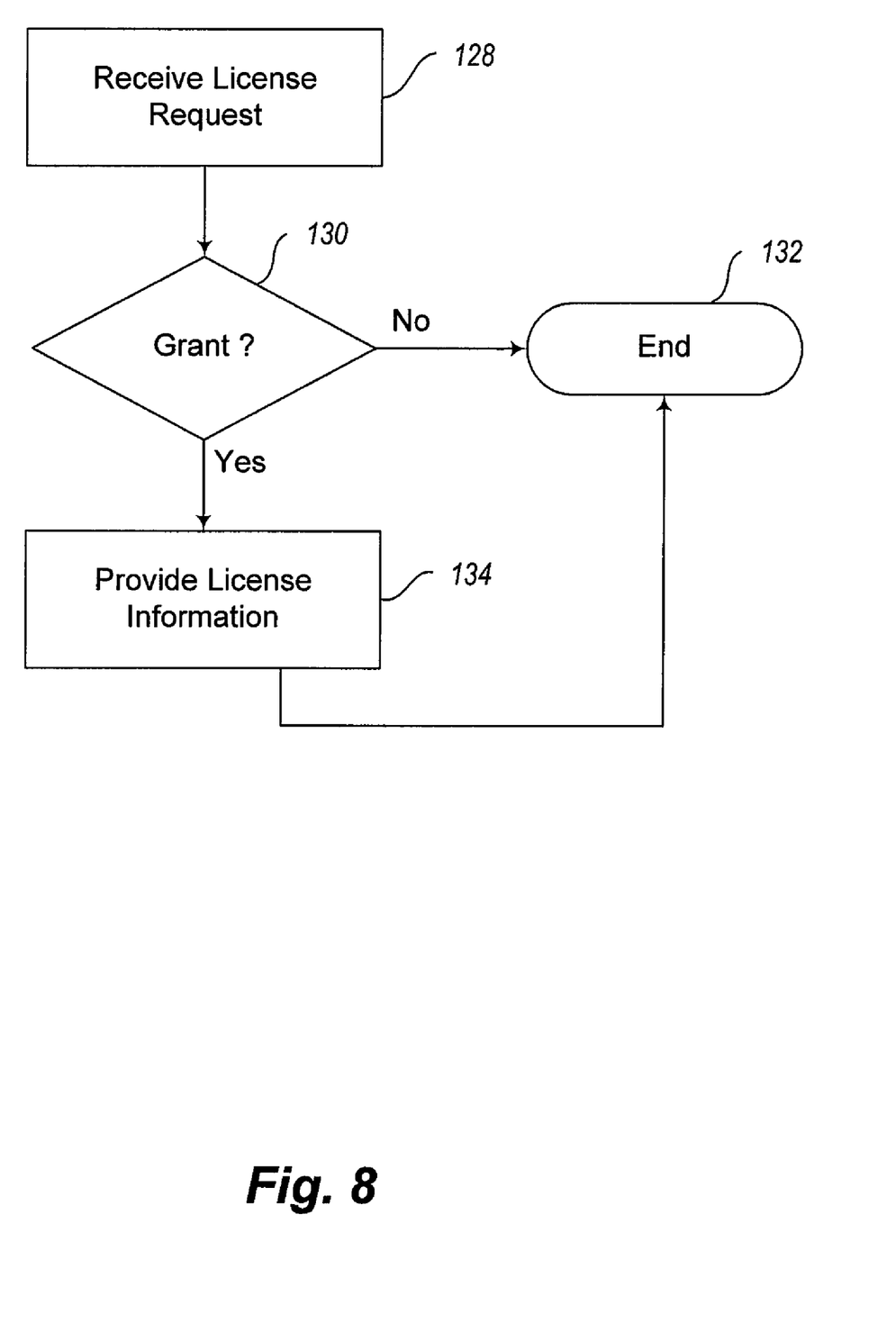
FIG. 8 is a flow diagram showing a method of providing license information.

FIG. 8 shows a method employed by the server 25 to make a work of content accessible according to one embodiment.

At 128, the server 25 receives a content access request from the content player 10. The content access request may include content player identifier information that identifies the content player 10. For example, content identifier information may indicate whether the content player 10 has record capabilities. The content access request may include content identifier information that identifies the work of content for which a license is being requested. The server 25 may use the content identifier information to determine which master authorization token(s) are associated with the work of content and/or which second authorization token(s) are associated with the work of content. The content access request may also include license information that may be related to an existing or expired license. For example the license information may include an identifier that the server 25 may use to retrieve the appropriate master authorization token(s) and/or the appropriate second authorization token(s). License information may also include information related to activation time indicator, expiration time indicator, and management rights indicator. The server 25 may use the license information to provide the appropriate activation time indicator, expiration time indicator, and management rights indicator.

At 130, the server 25 determines whether to provide the content player 10 with a license. Among other things, the decision may be based upon the characteristics of the content player 10 such as whether the content player 10 has the ability to record a work of content, or the decision may be based upon the billing information. In addition, the decision may be based upon the activation time for a work of content. In some embodiments, works of content can be distributed prior to the official "release time." If the server 25 receives a request for a license for a work of content prior to the official release time, the server 25 may decide to deny the request. If the decision is to deny the request, the server 25 sends notification that the content access request was denied and the process ends at 132.

At 134, the server 25 grants the content access request and provides the content player 10 with information that gives the content player 10 a valid license. In some situations, the server 25 may provide the content player 10 with one or more master authorization tokens, and in other situations, the server 25 may provide the content player 10 with one or more second authorization tokens. In yet other situations, the server 25 may provide the content player 10 with portions of one or more second authorization tokens such as one or more authorizers 56, one or more activation date indicators 58, one or more expiration date indicators 60, and one or more management rights indicators 62. In determining which information to provide the content player 10, the server 25 may use, among other things, the information related to the existing or expired license and/or the information related to the content player 10. For example, the information related to the existing or expired license might indicate the number of times that the content 22 has been played or the expiration time of the existing license, etc. In the event that the content player 10 had a license, but the license is expired, the server 25 can provide the content player 10 with a license by providing a new expiration time indicator.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for accessing content carried by a content carrier having a first computer readable medium and a second computer readable medium, the method comprising:
receiving the content carrier at a content player;
retrieving a first authorization token from the first computer readable medium;
retrieving a second authorization token from the second computer readable medium;
sending a content access request to a server;
receiving a master authorization token in response to the content access request;
determining whether to grant access to a segment of the content that is associated with the first and second authentication tokens using at least the master authorization token and the first and the second authorization tokens or portions thereof; and
in response to determining to grant access, retrieving the segment of the content from the first computer readable medium;
logically associating the master authorization token or a portion thereof, the first authorization token or a portion thereof, and the second authorization token or a portion thereof, wherein the logical association between the master authorization token, the first authorization token, and the third authorization token is at least one of an encryption function, a decryption function, an encryption function and decryption function, or a hash function.

2. The method of claim 1, further comprising:
retrieving the second authorization token from the second computer readable medium via a wireless communication link.

3. The method of claim 1, further comprising:
storing the received master authorization token in a memory of the content player; and
retrieving the master authorization token from the memory of the content player.

4. The method of claim 1, further comprising:
in response to determining to grant access, providing the segment of content to at least one of a display device, an audio device, an audio-visual display device, or a computing device.

* * * * *